United States Patent
Ogasawara

(10) Patent No.: US 9,908,555 B2
(45) Date of Patent: Mar. 6, 2018

(54) STEERING CONTROL DEVICE

(71) Applicant: DENSO CORPORATION, Kariya, Aichi-pref. (JP)

(72) Inventor: Terumoto Ogasawara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/204,854

(22) Filed: Jul. 7, 2016

(65) Prior Publication Data

US 2017/0008552 A1 Jan. 12, 2017

(30) Foreign Application Priority Data

Jul. 9, 2015 (JP) ................................. 2015-137567

(51) Int. Cl.
*B62D 5/00* (2006.01)
*B62D 5/04* (2006.01)

(52) U.S. Cl.
CPC ........... *B62D 5/008* (2013.01); *B62D 5/0481* (2013.01)

(58) Field of Classification Search
CPC .............................. B62D 5/008; B62D 5/0481
See application file for complete search history.

(56) References Cited

U.S. PATENT DOCUMENTS

| | | | | |
|---|---|---|---|---|
| 6,334,834 B1 * | 1/2002 | Mizutani | ............... | B60T 13/585 477/203 |
| 2002/0103055 A1 * | 8/2002 | Tani | ...................... | F02D 41/042 477/115 |
| 2004/0211381 A1 * | 10/2004 | Ogawa | ...................... | B60H 1/04 123/179.4 |
| 2005/0258796 A1 * | 11/2005 | Kusaka | ................. | B60L 3/0023 318/801 |
| 2008/0262707 A1 * | 10/2008 | Yamaguchi | ..... | B60W 30/18009 701/112 |
| 2008/0262708 A1 * | 10/2008 | Yamaguchi | ........... | F02D 41/266 701/112 |
| 2009/0292454 A1 | 11/2009 | Nakai | | |
| 2011/0010052 A1 | 1/2011 | Limpibunterng et al. | | |
| 2012/0185150 A1 * | 7/2012 | Horii | ........................ | F02D 29/02 701/102 |
| 2016/0297415 A1 * | 10/2016 | Kato | ................ | B60W 30/18118 |
| 2016/0297443 A1 * | 10/2016 | Kato | ...................... | B60T 7/122 |

FOREIGN PATENT DOCUMENTS

JP 2010-84737 A 4/2010
JP 5035059 B2 * 9/2012

* cited by examiner

*Primary Examiner* — Rodney A Butler
(74) *Attorney, Agent, or Firm* — Knobbe, Martens, Olson & Bear, LLP

(57) ABSTRACT

A steering control device for an eco-run vehicle drives an actuator so that a transfer ratio between a steering angle and an actual rudder angle is variable. The steering control device includes: a control part that controls a drive of the actuator; an eco-run determining part that receives an eco-run signal and notifies the control part that the eco-run signal is received; and a nonvolatile memory in which a control information on the actuator is able to be written. The control part executes a control restriction that restricts a drive of the actuator, and disables a writing of the control information on the nonvolatile memory, when the eco-run determining part receives the eco-run signal.

7 Claims, 7 Drawing Sheets

STEERING CONTROL DEVICE

CROSS REFERENCE TO RELATED APPLICATION

This application is based on Japanese Patent Application No. 2015-137567 filed on Jul. 9, 2015, the disclosure of which is incorporated herein by reference in its entirety.

TECHNICAL FIELD

The present disclosure relates to a steering control device.

BACKGROUND

A transfer ratio variable steering device that variably controls a transfer ratio between a steering angle and an actual rudder angle is known, for example, as a variable gear ratio steering (VGRS) device. The transfer ratio variable steering device changes the transfer ratio by controlling the drive of actuator such as VGRS motor. JP 4609515 B2 (US 2011/0010052 A1) describes a drive control of a VGRS motor according to operating state of an assistant motor of an electric power steering equipment.

From an environmental viewpoint to reduce fuel consumption, an eco-run vehicle (Stop-Start Systems) is developed. When the eco-run vehicle stops or slows down, the engine is suspended. When the eco-run vehicle starts or accelerates, the engine is started by cranking with a starter. The "eco-run" means economy and ecology running. The eco-run vehicle is synonymous with an idling stop vehicle.

SUMMARY

In case where a transfer ratio variable steering control is applied to an eco-run vehicle, a power supply may be used in common for a starter and an actuator. In this case, a voltage of the power supply is lowered at a cranking time by the starter, such that both of a voltage applied to the actuator and a voltage applied to the starter are lowered.

If the voltage applied to the actuator becomes lower than a threshold voltage, the actuator cannot be driven, or limited in the control. If the voltage applied to the starter becomes lower than a threshold voltage, the internal memory of the control device may disappear. Therefore, it is necessary to write and memorize control information in a nonvolatile memory, similarly to an ignition-off time. However, compared with a conventional vehicle, the number of cranking times increases in an eco-run vehicle. The number of wiring times to a nonvolatile memory may increase and exceed a threshold value.

It is an object of the present disclosure to provide a steering control device in which the number of writing times to a nonvolatile memory is restricted from exceeding a threshold value while a drive of an actuator is appropriately limited in connection with a voltage decrease at a cranking time of an eco-run vehicle.

According to an aspect of the present disclosure, a steering control device for an eco-run vehicle drives an actuator so that a transfer ratio between a steering angle and an actual rudder angle is variable, while an engine is suspended at a stop or deceleration time and the engine is restarted by cranking with a starter at a start or accelerating time based on an instruction output from an eco-run control device. A control voltage is supplied to the steering control device from a direct-current power supply via a control voltage line connected in parallel to the starter. A power voltage is supplied to the actuator from the direct-current power supply via a power voltage line connected in parallel to the starter. The control voltage is restricted from decreasing during the cranking.

The steering control device includes: a control part that controls a drive of the actuator; an eco-run determining part that receives an eco-run signal from the eco-run control device and that notifies the control part that the eco-run signal is received; and a nonvolatile memory in which a control information on the actuator is able to be written. The eco-run signal indicates a start of a cranking, or a state where a cranking is being performed. The control part executes a control restriction that restricts a drive of the actuator, and disables a writing of the control information on the nonvolatile memory, when the eco-run determining part receives the eco-run signal.

The control voltage supplied to the steering control device is secured not to decrease at the cranking time. Therefore, the memorized control information can be restricted from disappearing even if the control information is not written in the nonvolatile memory every time upon a cranking by eco-run. The control part does not execute the writing of the control information on the nonvolatile memory, when the eco-run determining part receives the eco-run signal. Therefore, the control information is written in the nonvolatile memory only at a time of ignition-off. Thus, the number of writing times to the nonvolatile memory can be restricted from exceeding a predetermined value when the transfer ratio variable equipment is applied to an eco-run vehicle in which the cranking number is large.

The eco-run determining part notifies the control part that the eco-run signal was received from the eco-run control device. Therefore, the control part can securely know that the cranking by eco-run is started from now on, or that the cranking is being performed now. The control part can appropriately restrict the drive of the actuator.

When the eco-run determining part receives the eco-run signal, and when the power voltage is less than the threshold voltage at which the actuator is drivable, the control part can perform the control restriction. Therefore, implementation of unnecessary control restriction is avoidable, when the eco-run signal is erroneously received while the cranking is not performed, or when a lowering in the power voltage does not affect the drive of the actuator.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
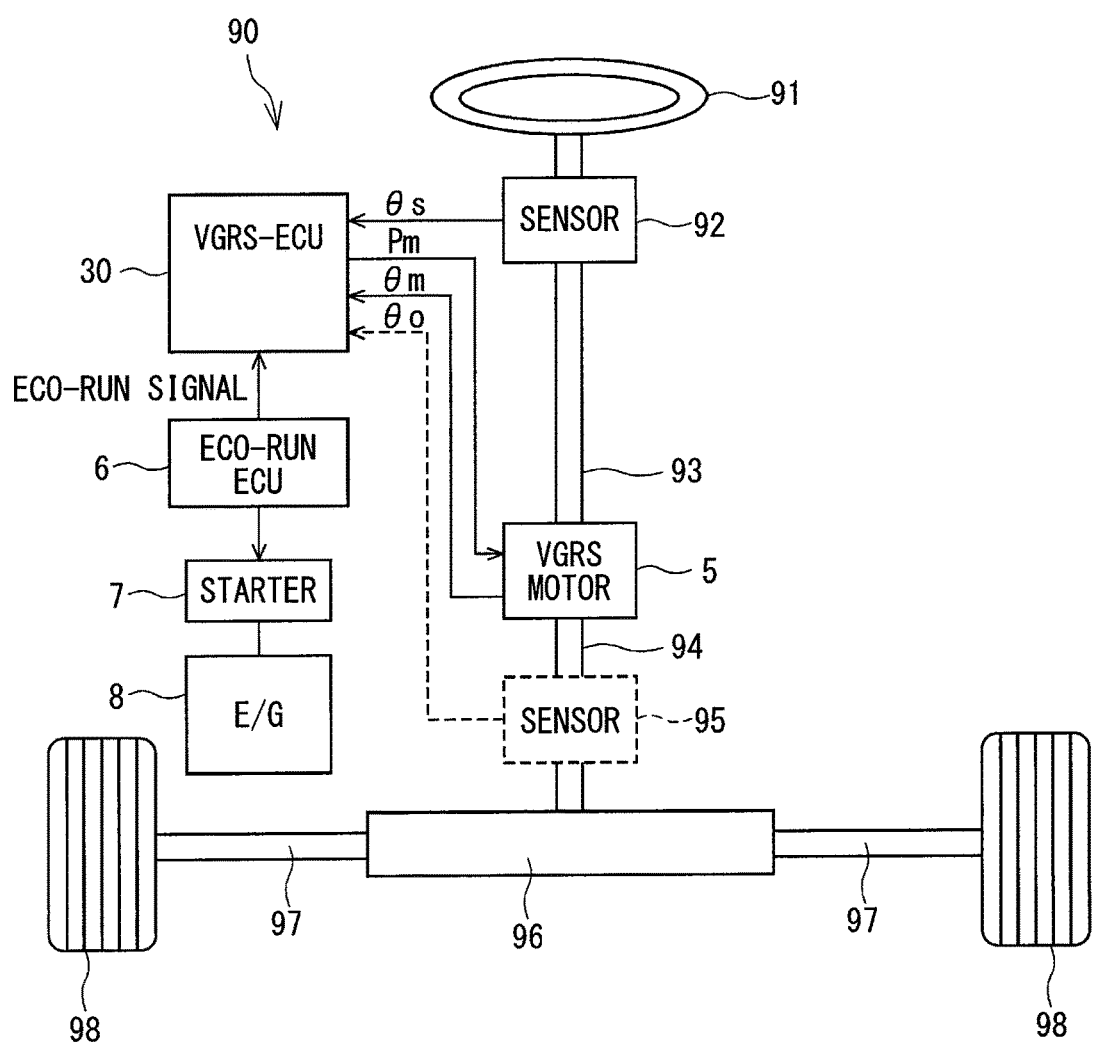
FIG. 1 is a schematic view illustrating an eco-run vehicle including a steering control device according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A steering control device is applied for a transfer ratio variable steering system of a vehicle in which an actuator is driven so that a transfer ratio between a steering angle and an actual rudder angle is variable. The transfer ratio variable steering system may be a variable gear ratio steering (VGRS) system. The steering control device is mounted to an eco-run vehicle in which the engine is suspended at a stop or deceleration time, and restarted by cranking with a starter at a start or accelerating time. Conventionally, a VGRS system applied to the eco-run vehicle is not so much known.

The eco-run vehicle including the steering control device and the VGRS system are explained with reference to FIG. 1 and FIG. 2. VGRS-ECU 30, VGRS motor 5, and eco-run ECU 6 respectively correspond to a steering control device, an actuator, and an eco-run control device. An actuator to be controlled by the VGRS-ECU 30 is not limited to the motor that outputs torque, and may be an actuator that is able to output a linear thrust.

The eco-run ECU 6 restarts the engine 8 by cranking with the starter 7, when the eco-run vehicle 90 starts or accelerates again after stop or slowdown. This cranking is referred to a cranking by eco-run. An eco-run signal represents a signal indicating a start of a cranking by eco-run from now on, or a state where the cranking by eco-run is being performed now. The eco-run ECU 6 transmits an eco-run signal to VGRS-ECU 30.

The VGRS motor 5 is disposed between an input shaft (steering shaft) 93 and an output shaft 94. A steering wheel 91 is connected to the upper end of the input shaft 93. A pinion (not shown) is connected to the lower end of the output shaft 94, and is engaged with a rack 97 in a gear box 96. Wheels 98 are connected to the both ends of the rack 97 through a tie rod and an arm (not shown).

A steering angle sensor 92 is disposed on the input shaft 93 of the VGRS motor 5, and detects a steering angle $\theta s$ of the steering wheel 91. An angle sensor of the VGRS motor 5 detects an operation amount $\theta m$ of the VGRS motor 5. Alternatively, an actual rudder angle sensor 95 may be installed, and directly detects a pinion angle which is the sum of the steering angle $\theta s$ and the operation amount $\theta m$ as an actual rudder angle $\theta o$.

VGRS-ECU 30 acquires the steering angle $\theta s$ detected by the steering angle sensor 92, the operation amount $\theta m$ of the VGRS motor 5, or the actual rudder angle $\theta o$ detected by the actual rudder angle sensor 95, and controls the drive of the VGRS motor 5 so that the transfer ratio between the steering angle $\theta s$ and the actual rudder angle $\theta o$ is variable. VGRS-ECU 30 receives an eco-run signal from the eco-run ECU 6, when the starter 7 is operated by a cranking by eco-run. In addition, signals such as vehicle speed signal may be inputted into VGRS-ECU 30 via in-vehicle LAN.

Figure 2:
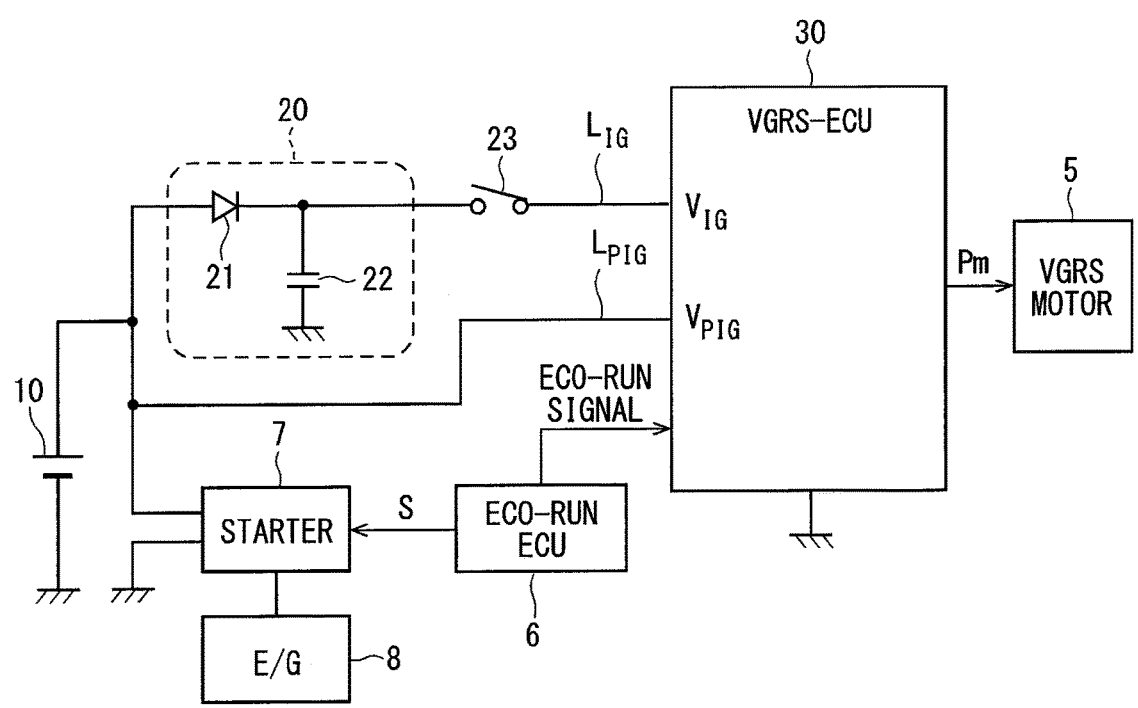
FIG. 2 is a block and circuit diagram illustrating the steering control device of the first embodiment.

As shown in FIG. 2, VGRS-ECU 30 and the starter 7 are connected in parallel with each other relative to a battery 10 which is common direct-current power supply. In detail, a control voltage $V_{IG}$ that activates VGRS-ECU 30 is supplied to VGRS-ECU 30 via a control voltage line $L_{IG}$ from the battery 10. A power voltage WIG which drives the VGRS motor 5 is supplied to VGRS-ECU 30 via a power voltage line $L_{PIG}$ from the battery 10.

A voltage holding circuit 20 is disposed in the control voltage line $L_{IG}$, and is located adjacent to the battery 10. An IG switch 23 is arranged between the voltage holding circuit 20 and VGRS-ECU 30, and is turned ON/OFF by ignition key. The voltage holding circuit 20 includes a diode 21 and a capacitor 22. The diode 21 allows a current to flow in a direction from the battery 10 to VGRS-ECU 30, and restricts a current from flowing in the opposite direction. The capacitor 22 is able to accumulate an electric charge at a position between VGRS-ECU 30 and the diode 21. The electric charge stored in the capacitor 22 is prevented from being emitted to the battery 10 by the diode 21. The power voltage line $L_{PIG}$ is directly connected to VGRS-ECU 30 from the battery 10.

When the battery voltage falls due to the power consumption by the starter 7 at a time of cranking by eco-run, the power voltage $V_{PIG}$ is also lowered. However, the control voltage $V_{IG}$ is restricted from falling by the voltage holding circuit 20. Since the electric charge stored in the capacitor 22 is limited, if the battery voltage cannot recover due to consumption of capacitor voltage, the control voltage $V_{IG}$ may fall when the cranking continues over a long time. Here, the time constant of the capacitor 22 is set so that the control voltage $V_{IG}$ can be secured relative to a predetermined longest cranking time.

VGRS-ECU 30 of this embodiment should just be applied to the VGRS system including the voltage holding circuit 20, and the spec of the voltage holding circuit 20 is not limited. For example, a second battery may be connected between VGRS-ECU 30 and the diode 21 in a voltage holding circuit. Theoretically, a similar voltage holding circuit may be disposed in the power voltage line $L_{PIG}$. However, it is not realistic because it is necessary to increase the capacity of the battery 10 in this case.

VGRS-ECU 30 may be referred to VGRS-ECU 301 in the first embodiment, VGRS-ECU 302 in the second embodiment, and VGRS-ECU 303 in the third embodiment. In each of the embodiments, VGRS-ECU conducts each control based on an eco-run signal received from the eco-run ECU 6.

Figure 3:
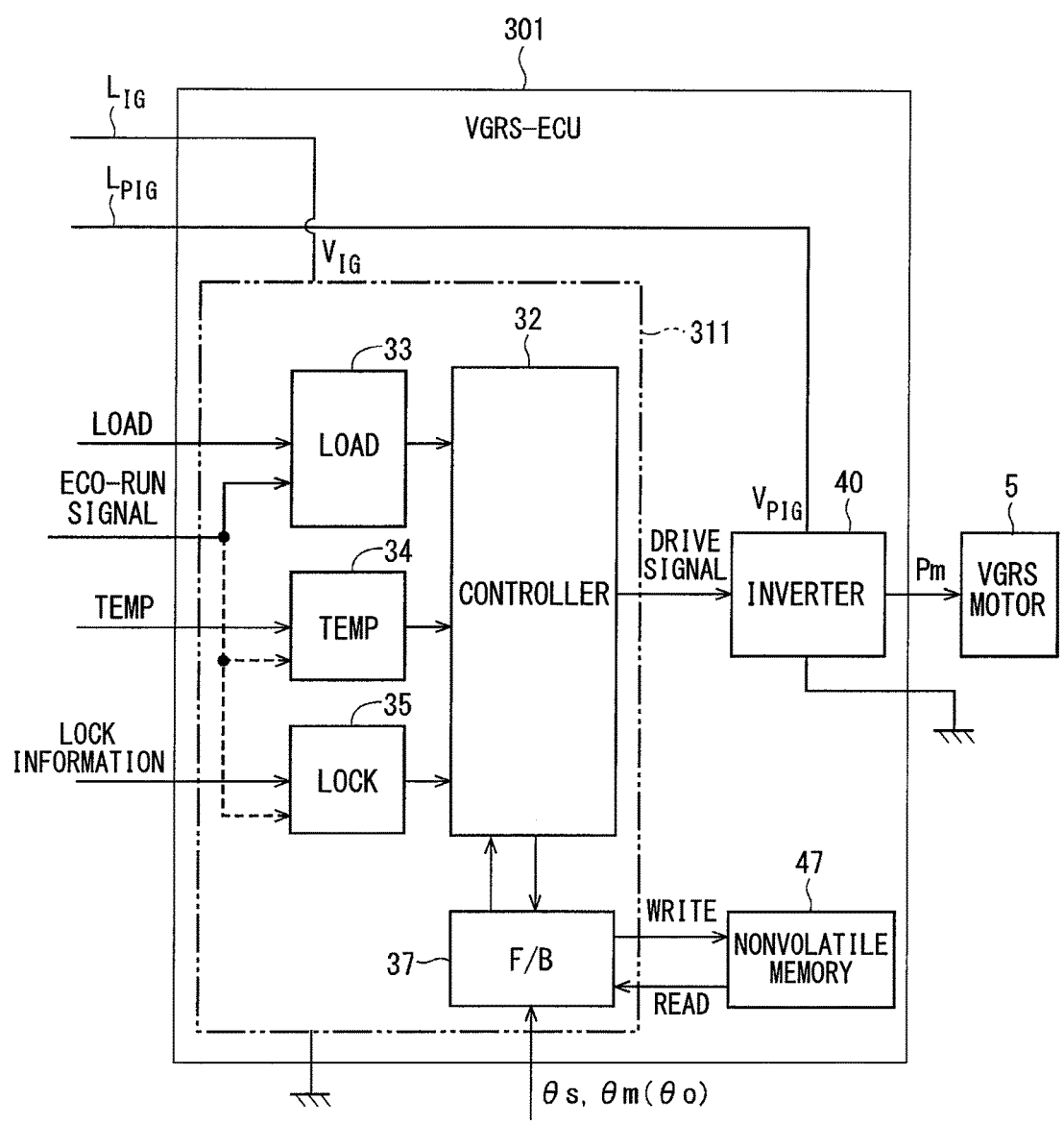
FIG. 3 is a control block diagram illustrating the steering control device of the first embodiment.

VGRS-ECU 301 in the first embodiment is explained with reference to FIG. 3 and FIG. 4. As shown in FIG. 3, VGRS-ECU 301 includes a microcomputer 311, an inverter 40, and a nonvolatile memory 47. The microcomputer 311 has a control part 32 (controller), a high load determining part 33, a temperature determining part 34, a lock determining part 35, and an angle feedback part (F/B) 37.

The control voltage $V_{IG}$ is supplied to the microcomputer 311 via the control voltage line $L_{IG}$. The power voltage $V_{PIG}$ is supplied to the inverter 40 via the power voltage line $L_{PIG}$. The microcomputer 311 of the first embodiment is configured by changing an existing microcomputer used for a vehicle which is not an eco-run vehicle.

The control part 32 performs a control operation related to the drive of the VGRS motor 5 based on input information such as angle inputted from the angle feedback part 37, and outputs a drive signal to the inverter 40. The inverter 40 converts input electric power based on the drive signal, and supplies the motor electric power Pm to the VGRS motor 5.

The angle feedback part 37 sends information including the steering angle θs acquired from the steering angle sensor 92, the operation amount θm of the VGRS motor 5, or the actual rudder angle θo acquired from the actual rudder angle sensor 95, to the control part 32. While the IG switch 23 is turned on, control information including the operation amount θm and the actual rudder angle θo, which indicate the position information on the VGRS motor 5, is memorized by the internal memory of the microcomputer 311. When the IG switch 23 is turned off, the last control information is written in the nonvolatile memory 47, such as EEPROM, and is memorized. When the IG switch 23 is turned on again, the control part 32 reads the control information from the nonvolatile memory 47, and conducts the control based on the position information on the VGRS motor 5.

As an existing external information determining part, the high load determining part 33, the temperature determining part 34, and the lock determining part 35 acquire respective external information, and send it to the control part 32. The high load determining part 33 determines the load state applied to the VGRS motor 5. The temperature determining part 34 determines the temperature change caused by heat emitted from VGRS-ECU 301 or VGRS motor 5. The lock determining part 35 determines the lock state of the input shaft 93 and the output shaft 94 of the VGRS motor 5. The other external information determining part which has similar function may also be used.

The control part 32 executes a control restriction which restricts the drive of the VGRS motor 5 when it is determined that the drive of the VGRS motor 5 should stop based on the information sent from the high load determining part 33, the temperature determining part 34, or the lock determining part 35. For example, when the high load determining part 33 detects a high load state in which a load higher than a predetermined value is applied, the control part 32 carries out the control restriction as a processing for the high load state. Specifically, as an example of the control restriction, a relative rotation between the input shaft 93 and the output shaft 94 is mechanically locked, to stop the VGRS motor 5 at the present position. Alternatively, the VGRS motor 5 may be stopped from rotating by turning on all the upper arms or all the lower arms of the inverter 40.

In the first embodiment, at least one of the existing external information determining parts corresponds to an eco-run determining part. The eco-run determining part receives the eco-run signal from the eco-run ECU 6, and sends a signal that the eco-run signal is received to the control part 32. In FIG. 3, a solid line represents an input of the eco-run signal in case where the high load determining part 33 corresponds to the eco-run determining part. As another example, a dashed line in FIG. 3 represents an input of the eco-run signal in case where the temperature determining part 34 or the lock determining part 35 corresponds to the eco-run determining part.

A routine of the cranking time processing in the first embodiment is described with reference to the flow chart of FIG. 4, in contrast to a comparative example shown in FIG. 8. The routine is repeated during which the ignition power supply is ON (i.e., while the control voltage $V_{IG}$ is supplied to VGRS-ECU 301 via the IG switch 23 from the battery 10).

First, a comparative example is described with reference to FIG. 8 as a routine of a voltage-lowered time processing. In the comparative example, both of the control voltage $V_{IG}$ and the power voltage $V_{PIG}$ are lowered by cranking with a starter in a conventional VGRS where the power supply is shared. In the comparative example, the voltage holding circuit is not arranged in the control voltage line $L_{IG}$. Moreover, VGRS does not have the function to receive the eco-run signal from the eco-run ECU 6.

Figure 8:
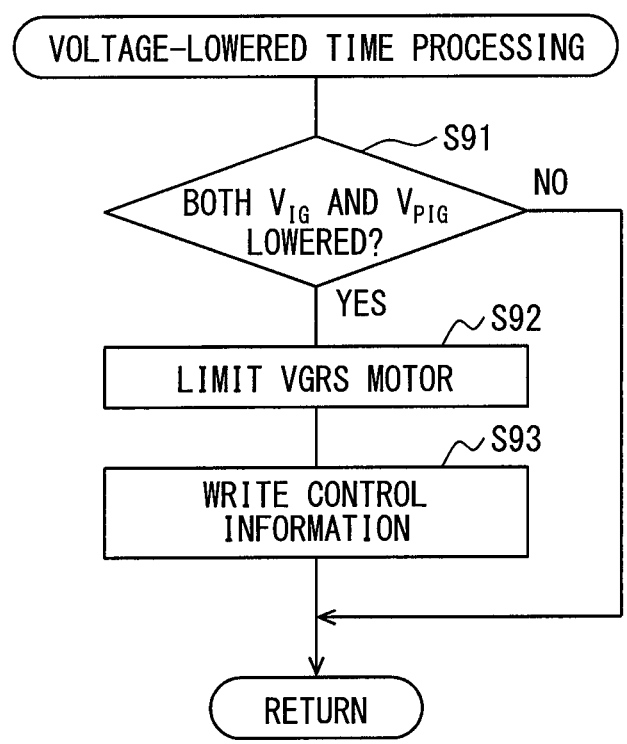
FIG. 8 is a flow chart of a comparative example.

In S91 of FIG. 8, it is determined whether both the control voltage $V_{IG}$ and the power voltage $V_{PIG}$ are lowered. Since it is presumed that the control voltage $V_{IG}$ and the power voltage $V_{PIG}$ are the same potential, the detection result for one of the voltages may be used for the other. Moreover, since a signal directly indicating a cranking with a starter is not inputted in the comparison example, the reason for the voltage lowering is not specified.

When it is determined that both the control voltage $V_{IG}$ and the power voltage $V_{PIG}$ are lowered in S91, the drive of the VGRS motor (actuator) is restricted corresponding to the fall in the power voltage $V_{PIG}$ in S92. Preferably, the VGRS motor is mechanically locked or stopped at the present rotation position by turning on all the upper arms or all the lower arms of the inverter.

In S93, corresponding to the fall in the control voltage $V_{IG}$, the control information is memorized to the nonvolatile memory in preparation for disappearance. S92 and S93 may be carried out in parallel.

Thus, in the comparative example, the control information is always memorized by the nonvolatile memory at the time of cranking with a starter. This is satisfactory in a conventional vehicle where the number of cranking times is limited. However, for an eco-run vehicle, since the number of cranking times increases, the number of writing times to the nonvolatile memory may increase and exceed a predetermined upper limit value.

Figure 4:
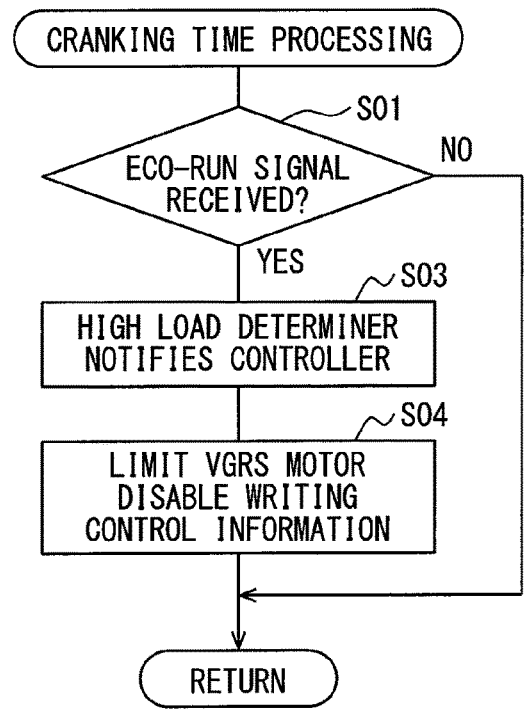
FIG. 4 is a flow chart of a cranking time processing by the steering control device of the first embodiment.

In contrast, in the cranking time processing of the first embodiment, as shown in FIG. 4, when the high load determining part 33 receives an eco-run signal from the eco-run ECU 6 (S01: YES), the high load determining part 33 determines a high load state. The high load determining part 33 notifies the control part 32 that the eco-run signal is received as a high load state using a flag (S03).

In response to this, the control part 32 changes the control. In other words, the notice to the control part 32 from the high load determining part 33 works as a trigger for changing the control. Specifically, the control part 32 carries out the control restriction which restricts the drive of the VGRS motor 5. The control restriction, in this embodiment, is carried out as a processing for a high load state. Moreover, the control part 32 disables the writing of the control information on the nonvolatile memory 47. When the high load determining part 33 does not receive an eco-run signal (S01: NO), the routine is ended, and VGRS-ECU 301 performs the drive control of the VGRS motor 5 as usual.

According to the first embodiment, the following advantages are obtained. As long as the IG switch 23 is turned on, there is no possibility that the control information in the internal memory of the microcomputer 311 may disappear, while the control information is not written in the nonvolatile memory 47 on every cranking by eco-run. This is because the control voltage $V_{IG}$ supplied to VGRS-ECU 301 from the battery 10 is secured not to decrease during the cranking by the voltage holding circuit 20 disposed in the control voltage line $L_{IG}$.

Therefore, when the high load determining part 33 which is an eco-run determining part receives an eco-run signal, the control part 32 carries out the control restriction of the VGRS motor 5, and disables the writing of the control information on the nonvolatile memory 47. Thus, as a first advantage, the number of writing times to the nonvolatile memory 47 can be restricted from exceeding a predetermined limit value when VGRS-ECU 301 is applied to the eco-run vehicle 90 in which the cranking number is large.

JP 2009-280162 A describes an art about a control of EPS motor of an electric power steering equipment applied to a vehicle with an idling stop function. When a cranking advance notice signal is transmitted to EPS-ECU from engine ECU, EPS-ECU gradually reduces a current instruction limit value and a boost voltage limit value. However, this art merely describes that an assistant power by the electric power-steering equipment is continuously supplied at a cranking time. This art is silent about a voltage holding circuit keeping the control voltage $V_{IG}$, and this art is silent about a control of VGRS.

As a second advantage, the control part 32 can know that a cranking by eco-run is started from now on, or a cranking by eco-run is being performed, because the high load determining part 33 which is an eco-run determining part notifies the control part 32 that the eco-run signal was received from the eco-run ECU 6. The control part 32 can restrict the drive of the VGRS motor 5 appropriately.

According to the first embodiment, the eco-run determining part is defined by adding the function to receive an eco-run signal to the high load determining part 33 which is the existing external information determining part of the microcomputer 311. When receiving an eco-run signal, the high load determining part 33 determines that it is under a high load state, and notifies the control part 32. The control part 32 carries out the control restriction as a processing for the high load state.

As a third advantage, the eco-run determining part can be defined using a proven existing logic, without adding new logic to the microcomputer 311. Therefore, in the same VGRS series, the basic control circuit can be made common between a conventional vehicle not having eco-run function and an eco-run vehicle. Moreover, the reliability can be raised, because a program error accompanying the addition of new logic can be avoided.

Similar advantages can be obtained when the high load determining part 33 is replaced with the temperature determining part 34 or the lock determining part 35 which is other existing external information determining part, as an eco-run determining part.

Second Embodiment

Figure 5:
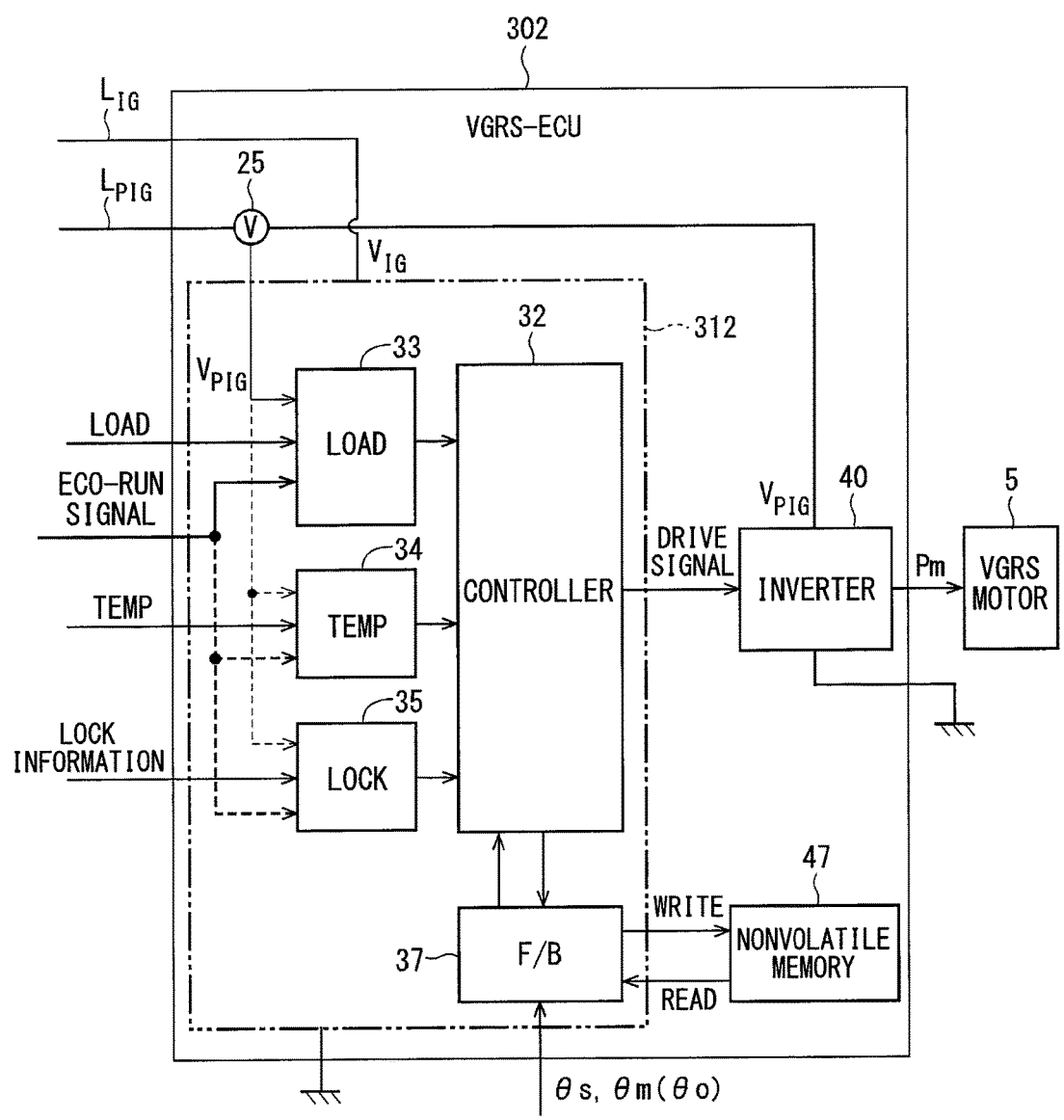
FIG. 5 is a control block diagram illustrating a steering control device according to a second embodiment.

VGRS-ECU 302 according to a second embodiment is explained with reference to FIG. 5 and FIG. 6. As shown in FIG. 5, VGRS-ECU 302 includes a power voltage detector 25 arranged in the power voltage line $L_{PIG}$, to detect the power voltage $V_{PIG}$. The power voltage detector 25 may be a well-known voltage detector that detects partial voltage.

The power voltage $V_{PIG}$ detected by the power voltage detector 25 is acquired by the high load determining part 33 which is an eco-run determining part. The microcomputer 312 is approximately the same as the microcomputer 311 of the first embodiment, and is different in that the power voltage $V_{PIG}$ is acquired.

Figure 6:
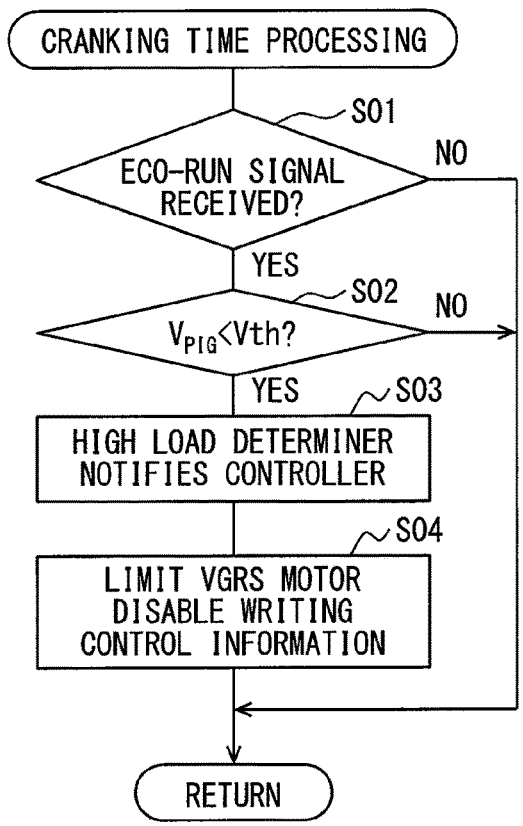
FIG. 6 is a flow chart of a cranking time processing by the steering control device of the second embodiment.

As shown in the flow chart of FIG. 6, the cranking time processing includes S02 in the second embodiment, compared with FIG. 4 of the first embodiment. When it is determined that the eco-run signal is received in S01, the power voltage $V_{PIG}$ and the threshold voltage Vth are compared with each other at S02. The threshold voltage Vth is set in advance as the minimum voltage by which the proper drive of the VGRS motor 5 is possible.

When the power voltage $V_{PIG}$ is less than the threshold voltage Vth (S02: YES), it is determined that the proper drive of the VGRS motor 5 is impossible, and shifts to S03. When the power voltage VPIG is more than or equal to the threshold voltage Vth (S02: NO), it is determined that the proper drive of the VGRS motor 5 is possible, and the routine is ended. Therefore, VGRS-ECU 302 performs the drive control of the VGRS motor 5 as usual.

If a cranking is not performed while the high load determining part 33 receives the cranking advance notice signal from the eco-run ECU 6, the high load determining part 33 restricts the drive control of the VGRS motor 5, in vain. This is the same in case where the high load determining part 33 erroneously receives an eco-run signal which is a noise, or in case where the engine 8 is started immediately after the power voltage $V_{PIG}$ is not so much lowered in response to a start of cranking.

According to the second embodiment, the control restriction is performed when the high load determining part 33 which is an eco-run determining part receives the eco-run signal and when the power voltage $V_{PIG}$ is less than the threshold voltage Vth. Thereby, implementation of unnecessary control restriction is avoidable in the situation where the proper drive of the VGRS motor 5 is possible.

In addition, similarly to the first embodiment, instead of the high load determining part 33, the temperature determining part 34 or the lock determining part 35 which is the other external information determining part may receive an eco-run signal and the power voltage $V_{PIG}$, as the eco-run determining part of the second embodiment.

Third Embodiment

Figure 7:
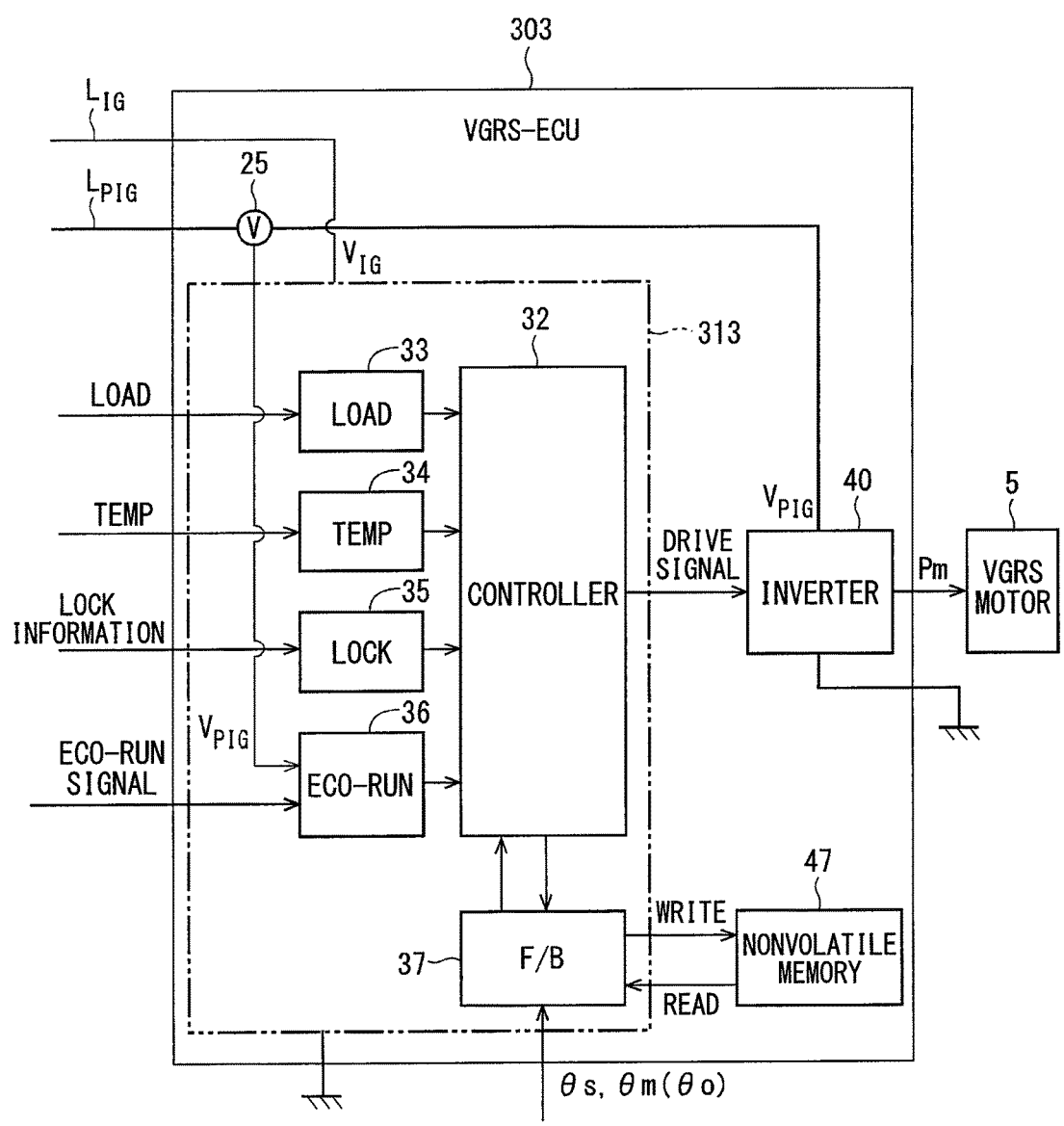
FIG. 7 is a control block diagram illustrating a steering control device according to a third embodiment.

VGRS-ECU 303 according to a third embodiment is explained with reference to FIG. 7. The microcomputer 313 of VGRS-ECU 303 has an exclusive eco-run determining part 36 in addition to the high load determining part 33, the temperature determining part 34, and the lock determining part 35. For example, the exclusive eco-run determining part 36 is independently and newly added to the existing external information determining parts in the existing microcomputer 313.

The exclusive eco-run determining part 36 receives an eco-run signal from the eco-run ECU 6, and notifies that to the control part 32. Alternatively, the exclusive eco-run determining part 36 may receive the power voltage $V_{PIG}$ from the power voltage detector 25, like the second embodiment. The control part 32 may be notified that the eco-run signal is received and that the power voltage $V_{PIG}$ is less than the threshold voltage Vth.

A flow chart of the third embodiment is defined by replacing a high load determining part with an exclusive eco-run determining part in FIG. 4 of the first embodiment, or FIG. 6 of the second embodiment.

The third embodiment attains the first advantage and the second advantage of the first embodiment. The third embodiment is advantageous when fully changing the circuitry, or when changing the other portion simultaneously other than the addition of the eco-run determining part.

Other Embodiment

The vehicle to which the steering control device is applied may be further equipped with an electric power-steering (EPS) equipment which assists a driver with steering torque. In that case, a current value driving an EPS motor may also be limited together with the control restriction to the VGRS actuator.

Such changes and modifications are to be understood as being within the scope of the present disclosure as defined by the appended claims.

What is claimed is:

1. A steering control device for an eco-run vehicle in which an engine is suspended at a stop or decelerating time and the engine is restarted by cranking with a starter at a start or accelerating time based on an instruction output from an eco-run control device, the steering control device comprising:
    a control part that controls a drive of an actuator so that a transfer ratio between a steering angle and an actual rudder angle is variable;
    an eco-run determining part that receives an eco-run signal from the eco-run control device and that notifies the control part that the eco-run signal is received, the eco-run signal indicating a start of a cranking, or a state where a cranking is being performed; and
    a nonvolatile memory in which a control information on the actuator is able to be written, wherein
    a power voltage is supplied to the actuator from a direct-current power supply via a power voltage line connected in parallel to the starter, while a control voltage is supplied to the steering control device from the direct-current power supply via a control voltage line connected in parallel to the starter, the control voltage being restricted from decreasing during the cranking, and
    the control part executes a control restriction that restricts a drive of the actuator, and disables a writing of the control information on the nonvolatile memory, when the eco-run determining part receives the eco-run signal.

2. The steering control device according to claim 1 the eco-run determining part determines whether the power voltage is higher than or equal to a threshold voltage, and
    the control part executes the control restriction, when the eco-run determining part receives the eco-run signal and when the power voltage is lower than the threshold voltage.

3. The steering control device according to claim 1, wherein
    the eco-run determining part is an external information determining part of an existing steering control device that determines and sends a predetermined external information to the control part, and
    the external information determining part receives the eco-run signal.

4. The steering control device according to claim 3, wherein
    the external information determining part is a high load determining part that determines a load state of the actuator,
    when the high load determining part receives the eco-run signal, the high load determining part determines a high load state and notifies the control part that a load higher than a predetermined value is applied, and
    the control part executes the control restriction as a processing for the high load state in the existing steering control device.

5. The steering control device according to claim 1, further comprising a voltage holding circuit in the control voltage line and that accomplishes the restriction of the control voltage from decreasing during the cranking.

6. The steering control device according to claim 5, further comprising a switch within the control voltage line that is configured to be controlled by an ignition of the eco-run vehicle.

7. The steering control device according to claim 1, wherein the power voltage is not restricted from decreasing during the cranking.

* * * * *